May 11, 1926.
F. BRISCOE ET AL
TIMER
Filed Dec. 27, 1922
1,584,429
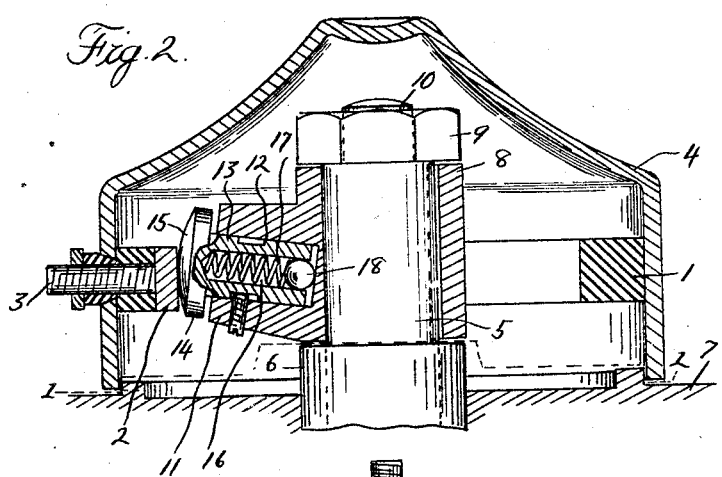
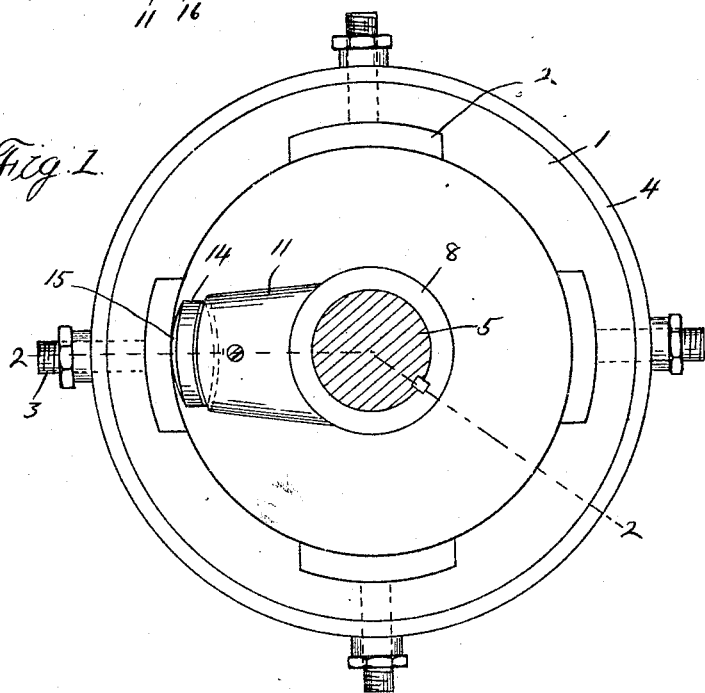
Inventors
Frank Briscoe
William S. Lee
By Whittemore Hulbert Whittemore Belknap
Attorneys Patented May 11, 1926.

1,584,429

UNITED STATES PATENT OFFICE.

FRANK BRISCOE, OF PONTIAC, AND WILLIAM S. LEE, OF DETROIT, MICHIGAN; SAID LEE ASSIGNOR TO SAID BRISCOE.

TIMER.

Application filed December 27, 1922. Serial No. 609,280.

The invention relates to timers or commutators for internal combustion engines and consists in certain improvements in construction, which are hereinafter fully described.

In one type of commutator which is in extensive use at present, a roller is journaled in one end of a lever, which is pivotally connected at the other end to a radial arm mounted upon the timing shaft. The roller contacts with an annular timing ring consisting of alternate segments of insulating and conducting material and is held in yielding engagement therewith by means of a spring. With this construction any irregularities in the periphery of the ring tend to force the roller out of contact momentarily which produces a pounding action causing an uneven wear in the ring, thereby shortening the life of the parts and producing irregularities of timing.

One of the objects of our invention is to provide a construction which will overcome the objection referred to and will stand up for long and continued service. Another object is to produce a commutator of simple construction which may be used as a replacement part in the ordinary type of commutator ring. These and other objects are attained by the novel construction and illustrated in the accompanying drawings.

Figure 1 is a sectional plan view on line 1—1 of Figure 2;

Figure 2 is a transverse section on the line 2—2 of Figure 1.

1 represents an annular ring of insulating material in which are inserted metallic contact points 2 electrically connected to the binding posts 3, which are mounted on but insulated from a suitable casing 4 engaging the engine housing 7. 5 is a rotatable shaft arranged concentrically of the annular ring 1 and mounted in a suitable bearing 6 in the engine casing 7.

8 is an arm which is keyed upon the shaft 5 and held in position by suitable means, such as the nut 9, which threadedly engages the end 10 of the shaft 5. The arm 8 has the radially extending portion 11 which is provided with a longitudinal bore 12, the axis of which is at a slight inclination with respect to the plane of the annular ring 1. A pin 13 is journaled in the bore 12 and provided with a head 14 having the outer surface 15 of spherical shape for contacting with the annular ring 1. The spherical surface 15 is preferably of smaller radius than the annular ring, thereby forming a point contact with the latter.

The pin 13 has a longitudinal bore 16 therein containing a coiled spring 17 which seats upon a ball 18 located in the longitudinal bore of the member 11 and serves to yieldingly hold the spherical head 15 in contact with the annular ring. For retaining the pin 13 in the longitudinal bore 12 when the annular ring 1 and casing 4 are removed, the pin is provided with an annular groove 19 into which a set screw 20 is inserted through the arm 11. The groove, however, is sufficiently wide so as to allow freedom of movement of the pin during the normal operation of the timer. The arm 8 is so arranged upon the shaft 5 that the spherical head 14 contacts with the annular ring at the center line of the ring, but because of the angular relation of the pin, the contacting point is offset with respect to the rotative axis of the pin. When the arm is rotated, friction between the head and ring will impart to the former a rotation in the bore 12, but this rotation is resisted by the friction of the pin in its bearing so that the spherical surface has both a sliding and a rolling contact with the timing ring.

This construction of timer has been found more satisfactory than the roller type, for it does not have the same tendency to mutilate the ring. This is due primarily to the fact that the pin cannot respond as quickly to any irregularities of the contacting surfaces, as it is resisted not only by the radially extended spring but also by the friction of the pin in its bearing, the latter being increased by the angular arrangement; also a better electrical contact is obtained since there is always a certain amount of sliding between the contacting surfaces.

What we claim as our invention is:—

1. In a timer for internal combustion engines, the combination with an annular ring having alternate segments of insulating and conducting material, of a concentric rotatable shaft, an arm mounted upon said shaft and provided with a longitudinal bore at an angle to the plane of said annular ring, a pin journaled in said bore, a head on said pin having a spherical contacting surface, and a spring for yieldingly holding said spherical head in contact with said annular ring.

2. In a timer for internal combustion engines, the combination with an annular ring having alternate segments of insulating and conducting material, of a concentric rotatable shaft, an arm secured to said shaft and provided with a longitudinal bore at an angle to the plane of said annular ring, a rotatable pin in said bore, a head on said pin having a spherical contacting surface of smaller radius than said annular ring, and a spring for yieldingly holding said spherical head in contact with said annular ring.

3. A replacement part for timers on internal combustion engines comprising a member adapted to be mounted on a rotating shaft concentric with an annular timing ring, an arm extending radially from said member and provided with a longitudinal bore arranged at a slight angle to the plane of said annular timing ring, a pin rotatable in said bore, a head on said pin having a spherical contacting surface for engaging said annular ring, and a spring for yieldingly holding said spherical head in contact therewith.

4. A replacement part for internal combustion engine timers comprising a member adapted to be mounted on a rotatable shaft concentric with the annular timing ring, an arm extending radially from said member provided with a longitudinal bore at an angle to the plane of said annular ring, a pin journaled in said bore, a head on said pin having a spherical contacting surface of smaller radius than said annular ring, and a spring for yieldingly holding said spherical head in contact with said annular ring.

5. A replacement part for internal combustion engine timers comprising a member adapted to be mounted on a shaft concentric with the annular timing ring, an arm extending from said member and provided with a longitudinal bore arranged at a slight angle to the plane of said annular ring, a pin rotatable in said bore, a head on said pin having a spherical contacting surface of smaller radius than said annular ring, a spring within said bore having one end abutting against said pin, and a ball engaging the opposite end of said spring.

6. In a timer for internal combustion engines, the combination with an annular ring having alternate segments of insulating and conducting material, of a rotatable shaft concentric with said ring, an arm secured to said shaft, a member rotatable about an axis transverse to said shaft and at an angle to the surface of said annular ring, and a spring arranged to urge said member longitudinally of said axis into contact with said ring.

In testimony whereof we affix our signatures.

FRANK BRISCOE.
WILLIAM S. LEE.